(12) United States Patent
Abhinav et al.

(10) Patent No.: US 11,941,771 B2
(45) Date of Patent: Mar. 26, 2024

(54) MULTI-DIMENSIONAL MODEL TEXTURE TRANSFER

(71) Applicant: Accenture Global Solutions Limited, Dublin (IE)

(72) Inventors: Kumar Abhinav, Hazaribag (IN); Alpana A. Dubey, Bangalore (IN); Suma Mani Kuriakose, Mumbai (IN); Devasish Mahato, Jamshedpur (IN)

(73) Assignee: Accenture Global Solutions Limited, Dublin (IE)

( * ) Notice: Subject to any disclaimer, the term of this patent is extended or adjusted under 35 U.S.C. 154(b) by 15 days.

(21) Appl. No.: 17/166,049

(22) Filed: Feb. 3, 2021

(65) Prior Publication Data
US 2022/0245908 A1    Aug. 4, 2022

(51) Int. Cl.
*G06T 19/20*    (2011.01)
*G06T 17/10*    (2006.01)

(52) U.S. Cl.
CPC .............. *G06T 19/20* (2013.01); *G06T 17/10* (2013.01); *G06T 2210/56* (2013.01); *G06T 2219/2024* (2013.01)

(58) Field of Classification Search
CPC ..... G06T 19/20; G06T 17/10; G06T 2210/56; G06T 2219/2024
See application file for complete search history.

(56) References Cited

U.S. PATENT DOCUMENTS

| | | | |
|---|---|---|---|
| 7,728,843 B2 * | 6/2010 | Maillot | G06T 15/04 345/428 |
| 8,266,519 B2 | 9/2012 | Verma et al. | |

(Continued)

FOREIGN PATENT DOCUMENTS

| | | |
|---|---|---|
| CN | 103443787 | 12/2013 |
| CN | 107436976 | 12/2017 |

(Continued)

OTHER PUBLICATIONS

Anny Yuniarti, Nanik Suciati, "A Review of Deep Learning Techniques for 3D Reconstruction of 2D Images", 2019, IEEE (Year: 2019).*

(Continued)

*Primary Examiner* — YuJang Tswei
(74) *Attorney, Agent, or Firm* — Fish & Richardson P.C.

(57) ABSTRACT

Implementations are directed to processing a content object model through a ML model to provide a set of base content feature representations, processing a style object model through the ML model to provide sets of base style feature representations, executing iterations including: generating, by the ML model, sets of stylized feature representations for an initial stylized object model, the initial stylized object model having one or more adjusted parameters relative to a previous iteration, determining a total loss based on the sets of stylized feature representations, the set of base content feature representations, and the sets of base style feature representations, and determining that the total loss is non-optimized, and in response, initiating a next iteration, executing an iteration of the iterative process, the iteration including determining that the total loss is optimized, and in response providing the initial stylized object model as output of the iterative process.

27 Claims, 5 Drawing Sheets

(56) References Cited

U.S. PATENT DOCUMENTS

| | | | |
|---|---|---|---|
| 8,271,870 | B2 | 9/2012 | Verma et al. |
| 8,412,516 | B2 | 4/2013 | Verma et al. |
| 8,442,985 | B2 | 5/2013 | Verma et al. |
| 8,566,731 | B2 | 10/2013 | Subramanian et al. |
| 8,671,101 | B2 | 3/2014 | Verma et al. |
| 8,677,313 | B2 | 3/2014 | Sharma et al. |
| 8,843,819 | B2 | 9/2014 | Verma et al. |
| 9,015,011 | B2 | 4/2015 | Sarkar et al. |
| 9,183,194 | B2 | 11/2015 | Verma et al. |
| 9,384,187 | B2 | 7/2016 | Verma et al. |
| 9,400,778 | B2 | 7/2016 | Ramani et al. |
| 9,519,986 | B1* | 12/2016 | Kolliopoulos ............ G06T 7/80 |
| 9,535,982 | B2 | 1/2017 | Verma et al. |
| 10,535,164 | B2 | 1/2020 | Shlens et al. |
| 10,769,764 | B2 | 9/2020 | Fang et al. |
| 10,950,021 | B2 | 3/2021 | Dubey et al. |
| 11,074,532 | B1 | 7/2021 | Kennell et al. |
| 11,244,484 | B2 | 2/2022 | Dubey et al. |
| 11,455,552 | B2 | 9/2022 | Liongosari et al. |
| 11,586,783 | B2 | 2/2023 | Martelaro et al. |
| 2006/0173874 | A1* | 8/2006 | Chen .................... G06T 5/20 |
| 2011/0123100 | A1* | 5/2011 | Carroll ................... G06N 5/01 |
| | | | 382/238 |
| 2014/0351694 | A1 | 11/2014 | Verma et al. |
| 2016/0165012 | A1 | 6/2016 | Li et al. |
| 2016/0300252 | A1* | 10/2016 | Frank ................. G06F 21/6245 |
| 2017/0076179 | A1 | 3/2017 | Martineau et al. |
| 2017/0116373 | A1 | 4/2017 | Ginsburg et al. |
| 2018/0075104 | A1 | 3/2018 | Oberbreckling et al. |
| 2018/0075602 | A1 | 3/2018 | Shen et al. |
| 2018/0082715 | A1* | 3/2018 | Rymkowski .......... G06V 20/10 |
| 2018/0146257 | A1 | 5/2018 | Seo et al. |
| 2019/0114699 | A1 | 4/2019 | Cook et al. |
| 2019/0228587 | A1* | 7/2019 | Mordvintsev ......... G06T 15/205 |
| 2019/0236814 | A1 | 8/2019 | Shlens et al. |
| 2019/0244329 | A1 | 8/2019 | Li et al. |
| 2019/0251616 | A1 | 8/2019 | Yankovich et al. |
| 2019/0259470 | A1 | 8/2019 | Olafson et al. |
| 2019/0318222 | A1 | 10/2019 | Mallela |
| 2019/0325008 | A1 | 10/2019 | Dubey et al. |
| 2019/0325088 | A1* | 10/2019 | Dubey .................. G06N 5/022 |
| 2019/0325628 | A1 | 10/2019 | Dubey et al. |
| 2019/0392192 | A1 | 12/2019 | Dubey et al. |
| 2020/0082578 | A1 | 3/2020 | Shlens et al. |
| 2020/0090318 | A1 | 3/2020 | Azoulay et al. |
| 2020/0117348 | A1 | 4/2020 | Jang et al. |
| 2020/0130936 | A1* | 4/2020 | Shekhawat ........... B25J 9/1664 |
| 2020/0151521 | A1 | 5/2020 | Almazan et al. |
| 2020/0193222 | A1 | 6/2020 | Singh et al. |
| 2020/0219111 | A1 | 7/2020 | Nair et al. |
| 2020/0226651 | A1 | 7/2020 | Rachidi et al. |
| 2020/0242111 | A1 | 7/2020 | Oberbreckling et al. |
| 2020/0250557 | A1 | 8/2020 | Kishimoto et al. |
| 2020/0312042 | A1 | 10/2020 | Sardari et al. |
| 2020/0320288 | A1 | 10/2020 | Kunnumma et al. |
| 2020/0365239 | A1 | 11/2020 | Sabharwal et al. |
| 2021/0142478 | A1* | 5/2021 | Abhinav ................ G06N 20/00 |
| 2021/0158180 | A1 | 5/2021 | Liongosari et al. |
| 2021/0264520 | A1* | 8/2021 | Cummings ............ G06Q 40/12 |
| 2021/0279967 | A1 | 9/2021 | Gernoth et al. |
| 2021/0319039 | A1 | 10/2021 | Gerber, Jr. et al. |
| 2021/0319173 | A1 | 10/2021 | Gerber, Jr. et al. |
| 2021/0350621 | A1* | 11/2021 | Bailey .................. G06T 3/4007 |
| 2021/0365488 | A1 | 11/2021 | Chen et al. |
| 2021/0365599 | A1 | 11/2021 | Martelaro et al. |
| 2022/0122173 | A1* | 4/2022 | Lopatin ................. G06Q 40/12 |
| 2022/0245510 | A1 | 8/2022 | Abhinav et al. |

FOREIGN PATENT DOCUMENTS

| | | |
|---|---|---|
| EP | 2081118 | 7/2009 |
| EP | 2296094 | 3/2011 |
| EP | 2362333 | 8/2011 |
| WO | WO 2012106133 | 8/2012 |

OTHER PUBLICATIONS

Cao et al., "Neural Style Transfer for Point Clouds", 2019, arXiv (Year: 2019).*
Miranda Nicole Shaw, "Lumbar Spine Endplate Biomechanics: An Experimental and Modeling Approach", 2010, ProQuest LLC (Year: 2010).*
Teimourzadeh et al., "A three-dimensional group search optimization approach for simultaneous planning of distributed generation units and distribution network reconfiguration", 2019, Applied Soft Computing Journal (Year: 2019).*
Gates et al. "Scientific Rotoscoping: A Morphology-Based Method of 3-D Motion Analysis and Visualization", 2010, Wiley-Liss, Inc. (Year: 2010).*
Ahmed et al., "EPN: Edge-Aware PointNet for Object Recognition form Multi-View 2.5D Point Clouds," Proceedings of the IEEE/RSJ International Conference on Intelligent Robots and Systems, Nov. 3-8, 2019, Macau, China, 7 pages.
Chang et al., "ShapeNet: An Information-Rich 3D Model Repository," arXiv, Dec. 9, 2015, arXiv:1512.03012v1, 11 pages.
Feng et al., "MeshNet: Mesh Neural Network for 3D Shape Representation," arXiv, Nov. 28, 2018, arXiv:1811.11424v1, 9 pages.
Gatys et al., "A Neural Algorithm of Artistic Style," arXiv, Aug. 26, 2015, arXiv:1508.06576v1, 16 pages.
Hanocka et al., "MeshCNN: A Network with an Edge," ACM Trans. Graphics, Feb. 2019, 1(1):90, 12 pages.
He et al., "GeoNet: Deep Geodesic Networks for Point Cloud Analysis," arXiv, Jan. 3, 2019, arXiv:1901.00680v1, 11 pages.
Li et al., "A closed-form solution to photorealistic image stylization," The European Conference on Computer Vision (ECCV), Munich, Germany, Sep. 8-14, 2018, 23 pages.
Mazeika et al., "Towards 3D Neural Style Transfer," Proceedings of the AAAI Conference on Artificial Intelligence and Interactive Digital Entertainment, Nov. 13-17, 2018, Edmonton, Alberta, Canada, 7 pages.
Mo et al., "PartNet: A Large-scale Benchmark for Fine-grained and Hierarchical Part-level 3D Object Understanding," Proceedings of the 2019 IEEE/CVF Conference on Computer Vision and Pattern Recognition (CPVR), Jun. 16-20, 2019, Long Beach, California, USA, 909-918.
Pham et al., "SceneCut: Joint Geometric and Object Segmentation for Indoor Scenes", May 24, 2018, arXiv:1709.07158v2, 8 pages.
PointClouds.org [online], "pcl::StatisticalOutlierRemoval< PointT > Class Template Reference," available on or before Aug. 8, 2020, via Internet Archive: Wayback Machine URL<https://web.archive.org/web/20200808065826/https://pointclouds.org/documentation/classpcl_1_1_statistical_outlier_removal.html>, retrieved on Feb. 4, 2021, retrieved from URL<https://pointclouds.org/documentation/classpcl_1_1_statistical_outlier_removal.html>, 7 pages.
PointClouds.org [online], "radius_outlier_removal.h," upon information and belief, available no later than Dec. 17, 2020, retrieved on Feb. 4, 2021, retrieved from URL<https://pointclouds.org/documentation/radius_outlier_removal_8h_source.html>, 5 pages.
Princeton.edu [online], "Princeton ModelNet," available on or before Mar. 9, 2015 via Internet Archive: Wayback Machine URL<https://web.archive.org/web/20150309054238/https://modelnet.cs.princeton.edu/download.html>, retrieved on Nov. 6, 2020, retrieved from URL<https://modelnet.cs.princeton.edu/download.html>, 3 pages.
Qi et al., "PointNet: Deep Learning on Point Sets for 3D Classification and Segmentation," arXiv, Apr. 10, 2017, arXiv:1612.00593v2, 19 pages.
Qi et al., "PointNet++: Deep Hierarchical Feature Learning on Point Sets in a Metric Space," arXiv, Jun. 7, 2017, arXiv:1706.02413v1, 14 pages.
Szegedy et al., "Going deeper with convolutions," arXiv, Sep. 17, 2014, arXiv:1409.4842v1, 12 pages.
Szegedy et al., "Inception-v4, Inception-ResNet and the Impact of Residual Connections on Learning," arXiv, Aug. 23, 2016, arXiv:1602.07261v2, 12 pages.
Szegedy et al., "Rethinking the Inception Architecture for Computer Vision," arXiv, Dec. 11, 2015, arXiv:1512.00567v3, 10 pages.
Wu et al., "3D ShapeNets: A Deep Representation for Volumetric Shapes," Proceedings of the 2015 IEEE Conference on Computer (56) References Cited

OTHER PUBLICATIONS

Vision and Pattern Recognition (CPVR), Jun. 7-12, 2015, Boston, Massachusetts, USA, 1912-1920.
Pinquie, Romain et al., "A Property Graph Data Model for a Context-Aware Design Assistant", Feb. 2020. (Year: 2020).
Yan, Hehua et al., "KnowIME: A System to Construct a Knowledge Graph for Intelligent Manufacturing Equipment", Mar. 11, 2020, Advances in Machine Learning and Cognitive Computing for Industry Applications, IEEE Access. (Year: 2020).

* cited by examiner

MULTI-DIMENSIONAL MODEL TEXTURE TRANSFER

BACKGROUND

Product lifecycles can include multiple processes. Example processes can include, without limitation, a design process, a testing process, and a production process. Each process can include one or more phases. For example, an example design process can include a requirements phase, a design phase, an evaluation phase, and a prototyping phase. In the design phase, a product is designed. Example products can include individual objects (e.g., chair, couch, table) and spaces (e.g., room, vehicle interior). Designs can include wholly original designs, combinations of existing designs, and derivatives of existing designs.

In modern design processes, much of the design process is performed using computers and design information stored as data (e.g., multi-dimensional models, images). For example, a designer can use computer-executable design tools to generate designs represented in digital files (e.g., model files, image files). The design process, however, can be a tedious, iterative process as the designer seeks to capture an appealing design. This can include both the shape of objects as well as styles applied to objects. Consequently, the design process can place a significant demand on resources, such as processors and memory, as the designer iterates over multiple designs.

SUMMARY

Implementations of the present disclosure are generally directed to computer-implemented systems for assisting in product design phases. More particularly, implementations of the present disclosure are directed to a computer-implemented intelligent design platform for assisting in design phases of products. In some implementations, the intelligent design platform of the present disclosure includes multi-dimensional model style transfer that enables a texture of a style object to be at least partially applied to content of a content object in a stylized object. In some examples, the style transfer includes applying at least a portion of a style (e.g., texture) of the style object to the content of the content object. In some examples, the style object is represented as a multi-dimensional style object model and the content object is represented as a multi-dimensional content object model. In some examples, at least a portion of the texture of the style object, as represented in the multi-dimensional style object model, is applied to content of the multi-dimensional content object model to provide the multi-dimensional stylized object model.

In some implementations, actions include processing a content object model through a machine learning (ML) model to provide a set of base content feature representations, processing a style object model through the ML model to provide sets of base style feature representations, executing two or more iterations of an iterative process, each of the two or more iterations including: generating, by the ML model, sets of stylized feature representations for an initial stylized object model, the initial stylized object model having one or more adjusted parameters relative to a previous iteration, determining a total loss based on the sets of stylized feature representations, the set of base content feature representations, and the sets of base style feature representations, and determining that the total loss is non-optimized, and in response, initiating a next iteration, executing an iteration of the iterative process, the iteration including determining that the total loss is optimized, and in response providing the initial stylized object model as output of the iterative process, and smoothing the initial stylized object model to provide a stylized object model representing a stylized object including at least a portion of content of the content object model and at least a portion of a texture of the style object model. Implementations of the present disclosure also include corresponding systems, apparatus, and computer programs, configured to perform the actions of the methods, encoded on computer storage devices.

These and other implementations can each optionally include one or more of the following features: the set of base content feature representations includes local feature representations output by a layer of the ML model; the sets of stylized feature representations include a set of local feature representations for each of a plurality of layers of the ML model; the sets of base style feature representations include a set of local feature representations for each of a plurality of layers of the ML model; the total loss is determined at least partially based on a content loss, the content loss being calculated based on differences between the set of base content feature representations and a set of stylized feature representations of the sets of stylized feature representations, set of stylized feature representations corresponding to a layer of the ML model; the total loss is determined at least partially based on a style loss, the style loss being calculated based on differences between the sets of base style feature representations and the sets of stylized feature representations, each set of base style feature representations and each set of stylized feature representations corresponding to a layer of the ML model; smoothing at least partially includes executing an averaging routine based on the initial stylized object model and the content object model; each of the content object model, the style object model, and the stylized object model is provided as a mesh model and the ML model includes MeshNet; and each of the content object model, the style object model, and the stylized object model is provided as a point cloud model and the ML model includes PointNet.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Implementations of the present disclosure are generally directed to computer-implemented systems for assisting in product design phases. More particularly, implementations of the present disclosure are directed to a computer-implemented intelligent design platform for assisting in design phases of products. In some implementations, the intelligent design platform of the present disclosure includes multi-dimensional model style transfer that enables a texture of a style object to be at least partially applied to content of a content object in a stylized object. In some examples, the style transfer includes applying at least a portion of a texture of the style object to the content of the content object. In some examples, the style object is represented as a multi-dimensional style object model and the content object is represented as a multi-dimensional content object model. In some examples, at least a portion of the texture of the style object, as represented in the multi-dimensional style object model, is applied to content of the multi-dimensional content object model to provide the multi-dimensional stylized object model.

In some implementations, actions include processing a content object model through a machine learning (ML) model to provide a set of base content feature representations, processing a style object model through the ML model to provide sets of base style feature representations, executing two or more iterations of an iterative process, each of the two or more iterations including: generating, by the ML model, sets of stylized feature representations for an initial stylized object model, the initial stylized object model having one or more adjusted parameters relative to a previous iteration, determining a total loss based on the sets of stylized feature representations, the set of base content feature representations, and the sets of base style feature representations, and determining that the total loss is non-optimized, and in response, initiating a next iteration, executing an iteration of the iterative process, the iteration including determining that the total loss is optimized, and in response providing the initial stylized object model as output of the iterative process, and smoothing the initial stylized object model to provide a stylized object model representing a stylized object including at least a portion of content of the content object model and at least a portion of a texture of the style object model.

To provide context for implementations of the present disclosure, a product lifecycle can include multiple processes. Example processes can include, without limitation, a design process, a testing process, and a production process. Each process can include one or more phases. For example, an example design process can include a requirements phase, a design phase, an evaluation phase, and a prototyping phase. In some examples, the requirements phase includes provision of a high-level outline (e.g., notes, sketches) of the product including requirements (e.g., expected features, functions, and the like). In some examples, the design phase can include producing a product design based on the requirements. For example, modeling tools (e.g., Creo, AutoCAD, Catia, SolidWorks, Onshape) to produce computer-implemented models (e.g., 2D/3D models) of the product. In some examples, the evaluation phase can include evaluating the product model (e.g., FEA, CFD, MBD, structural analysis, thermal analysis, stability analysis) using evaluation tools (e.g., Ansys, Hypermesh, Hyperworks) to identify strengths/weaknesses, and/or whether the product model meets the requirements. In some examples, the prototyping phase includes producing a physical prototype of the product based on the product design. For example, the product model is converted to code for CNC machining, and/or 3D using one or more prototyping tools (e.g., Creo, DellCAM, MasterCAM).

In each instance, the design process is iterative. For example, iterations of designs are provided, each iteration including changes to an earlier design. Inefficiencies are introduced, as the number of iterations increases. That is, for example, at each iteration, designers spend time, and resources (e.g., computing resources) to refine the design. Current design processes lack tools to reduce the number of iterations and increase the efficiency of the design process.

In view of this, implementations of the present disclosure provide a computer-implemented intelligent design platform for assisting in design phases of products. In some implementations, the intelligent design platform of the present disclosure includes multi-dimensional style transfer that enables a texture of a style object to be at least partially applied to a content object. In some examples, the style transfer includes applying at least a portion of a texture of the style object to content of the content object to provide a stylized object. In some examples, the style object is represented as a multi-dimensional style object model (also referred to herein as a style object model), the content object is represented as a multi-dimensional content object model (also referred to herein as a content object model), and the stylized object is represented as a multi-dimensional stylized object model (also referred to herein as a stylized object model). As described herein, the multi-dimensional style transfer is executed using one or more machine-learning (ML) models.

Implementations of the present disclosure are described in further detail herein with non-limiting reference to each of the content object model and the style object model being represented as a multi-dimensional mesh model. In general, a mesh model can be described as a multi-dimensional mesh representation of an object that includes a mesh of interconnected polygons (e.g., triangles), each shape representing a face of the object. More particularly, a mesh model is represented as mesh data that includes sets of vertices, edges, and faces, where vertices are connected with edges and closed sets of edges form faces. In some examples, the faces are polygons, such as triangles. Implementations of the present disclosure are described in further detail herein with non-limiting reference to triangles. In some examples, the mesh model includes a set of n faces, and each face is defined as a set of initial values. In some examples, the set of initial values includes face information and neighbor information. Examples of face information include center (e.g., coordinates [x, y, z] of the center point), corner (e.g., vectors from the center point to each vertex), and normal (e.g., unit normal vector). Example neighbor information includes neighbor index (e.g., indexes of connected faces).

While mesh models are discussed herein, it is contemplated that implementations of the present disclosure can be realized using any appropriate type of model. For example, implementations of the present disclosure can be realized with each of the content object model and the style object model being represented as a multi-dimensional point cloud model. In general, a point cloud model can be described as a multi-dimensional point representation of an object that includes a set of n points defined by a coordinate system. In some examples, each point is represented by coordinates (e.g., [x, y, z]). In some examples, additional dimensions can be added to the representation of each point by, for example, determining normals, local features (e.g., color channels (RGB)), and/or global features.

In some implementations, and as introduced above, multi-dimensional style transfer of the present disclosure includes applying at least a portion of a texture of the style object to the content of the content object to provide a stylized object. In some examples, prior to executing style transfer, a stylized object model is initialized as the content object model. That is, for example, the stylized object model is identical to the content object model. In some implementations, the style transfer is executed as an iterative process, where, at each iteration, sets of stylized feature representations (of the stylized object, to which the texture is being transferred) is generated, and a total loss is determined based on a set of base content feature representations, sets of base style feature representations, and the sets of stylized feature representations. In some examples, and as described in further detail herein, each of the set of base content feature representations, the sets of base style feature representations, and the sets of stylized feature representations is generated by processing the stylized object and the style object, respectively, through one or more ML models. In some examples, and as described in further detail herein, each of the set of base content feature representations, the sets of base style feature representations, and the sets of stylized feature representations can be provided as local feature representations (e.g., local feature vectors) from one or more layers of an ML model.

In some implementations, for each iteration, it is determined whether the total loss is optimized (e.g., meets a threshold total loss). If the total loss is not determined to be optimized, a next iteration is executed, in which one or more parameters of the stylized object model is updated. In some examples, in the next iteration, the sets of stylized feature representations are generated using the one or more ML models. If the total loss is determined to be optimized, the iterative process ends, and the stylized object provided as input to the last iteration is provided as output of the iterative process. In some examples, smoothing is executed to smooth the stylized object, as described in further detail herein.

Figure 1:
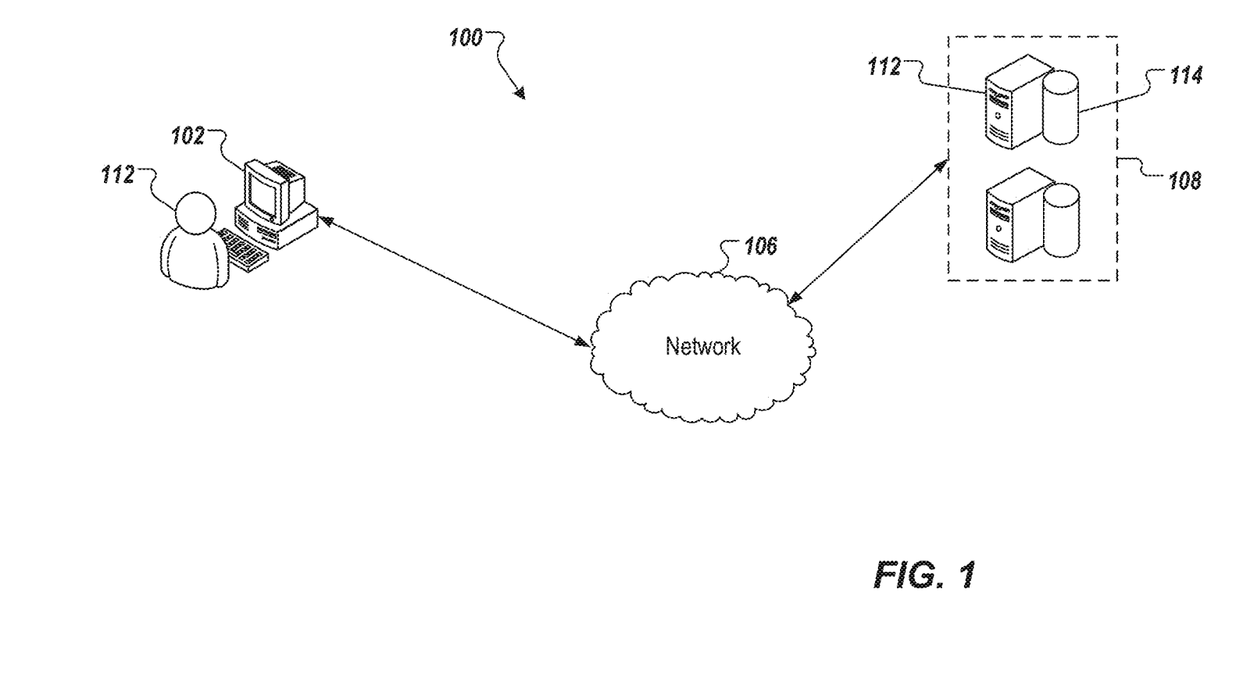
FIG. 1 depicts an example system that can execute implementations of the present disclosure.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host one or more applications that are provided as part of an intelligent design platform in accordance with implementations of the present disclosure.

In some examples, the back-end system 108 hosts an intelligent design platform that provides multi-dimensional style transfer in accordance with implementations of the present disclosure. For example, a user 120 (e.g., a designer) can interact with the intelligent design platform using the computing device 102. In some examples, the user 120 can provide a content object model and a style object model, which can be processed to provide a stylized object model by applying at least a portion of a texture of the style object model to the content object model, as described in further detail herein.

Figure 2:
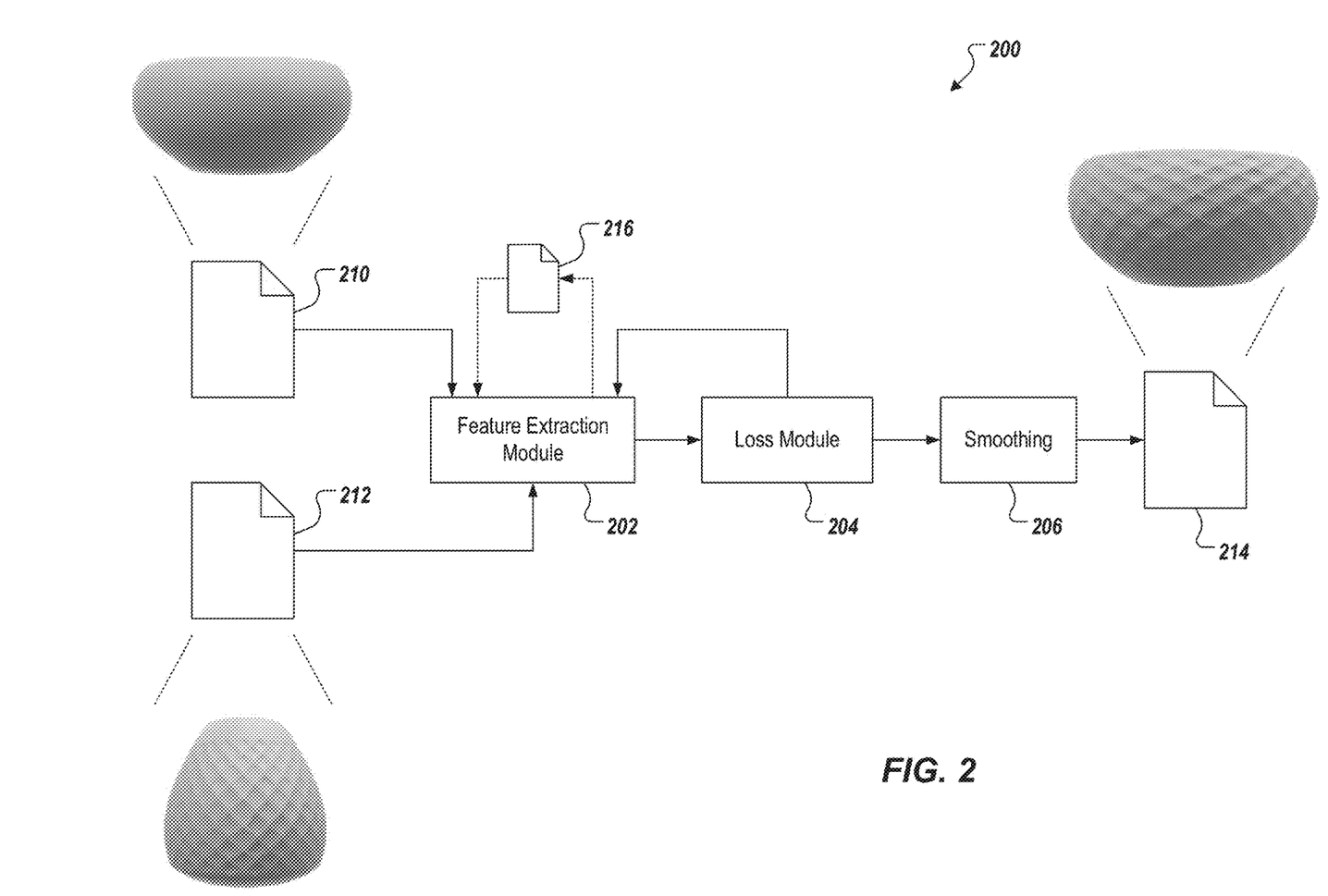
FIG. 2 depicts a conceptual architecture for multi-dimensional style transfer in accordance with implementations of the present disclosure.

FIG. 2 depicts an example conceptual architecture 200 for multi-dimensional style transfer in accordance with implementations of the present disclosure. The example conceptual architecture 200 can be part of an intelligent design platform and represents multi-dimensional style transfer through application of at least a portion of a texture of a style object model to a content object model. Here, the content object model represents content as a target, to which a texture of the style object model is to be applied. That is, the style object model is the source of the texture and the content object model provides the content, to which the texture (or at least a portion of the texture) is applied.

The example conceptual architecture 200 of FIG. 2 includes a feature extraction module 202, a loss module 204, and a smoothing module 206. As described in further detail herein, a content object model 210 and a style object model 212 are provided as input and a stylized object model 214 is provided as output. In some examples, the content object model 210, the style object model 212, and the stylized object model 214 are each digitally represented within a respective computer-readable file, which can be processed through the conceptual architecture 200.

In some examples, the content object model 210, the style object model 212, and the stylized object model 214 are each provided as mesh models, described in further detail herein by way of example. As introduced above, a mesh model is represented as mesh data that includes sets of vertices, edges, and faces, where vertices are connected with edges and closed sets of edges form faces. In some examples, the faces are polygons, such as triangles. Implementations of the present disclosure are described in further detail herein with non-limiting reference to triangles. In some examples, the mesh model includes a set of n faces, and each face is defined as a set of initial values. In some examples, the set of initial values includes face information and neighbor information. Examples of face information include center (e.g., coordinates [x, y, z] of the center point), corner (e.g., vectors from the center point to each vertex), and normal (e.g., unit normal vector). Example neighbor information includes neighbor index (e.g., indexes of connected faces). Again, and as noted above, implementations of the present disclosure can be realized with each of the content object model and the style object model being represented as any appropriate type of model, such as a multi-dimensional point cloud model, for example.

In some implementations, prior to executing the iterative process (iterative texture transfer process), the content object model 210 and the style object model 212 are each processed through one or more ML models by the feature extraction model 202 to respectively provide a set of base content feature representations and sets of base style feature representations. In some examples, each of the set of base content feature representations and the sets of base style feature representations are processed by the loss module 204 as baseline feature representations to determine the total loss at each iteration of the iterative process (e.g., comparing output feature representations to the base feature representations).

In further detail, and in the example context of mesh models, to provide each of the set of base content feature representations and the sets of base style feature representations, the content object model 210 and the style object model 212 are each processed through a ML model. An example ML model includes MeshNet, which is described in detail in *MeshNet: Mesh Neural Network for 3D Shape Representation*, Feng et al., Nov. 28, 2018 ("Feng"), which is expressly incorporated herein by reference in the entirety. In general, Feng describes MeshNet as a mesh neural network that learns on mesh data directly for 3D shape representation, and that faces are regarded as the unit and connections between faces sharing common edges are defined (e.g., as discussed above). In some implementations, MeshCNN is trained during a training phase using at least a portion of the ShapeNet dataset, which is described in *ShapeNet: An Information-Rich 3D Model Repository*, Chang et al. (www.shapenet.org), which is expressly incorporated herein by reference in the entirety.

Figure 3:
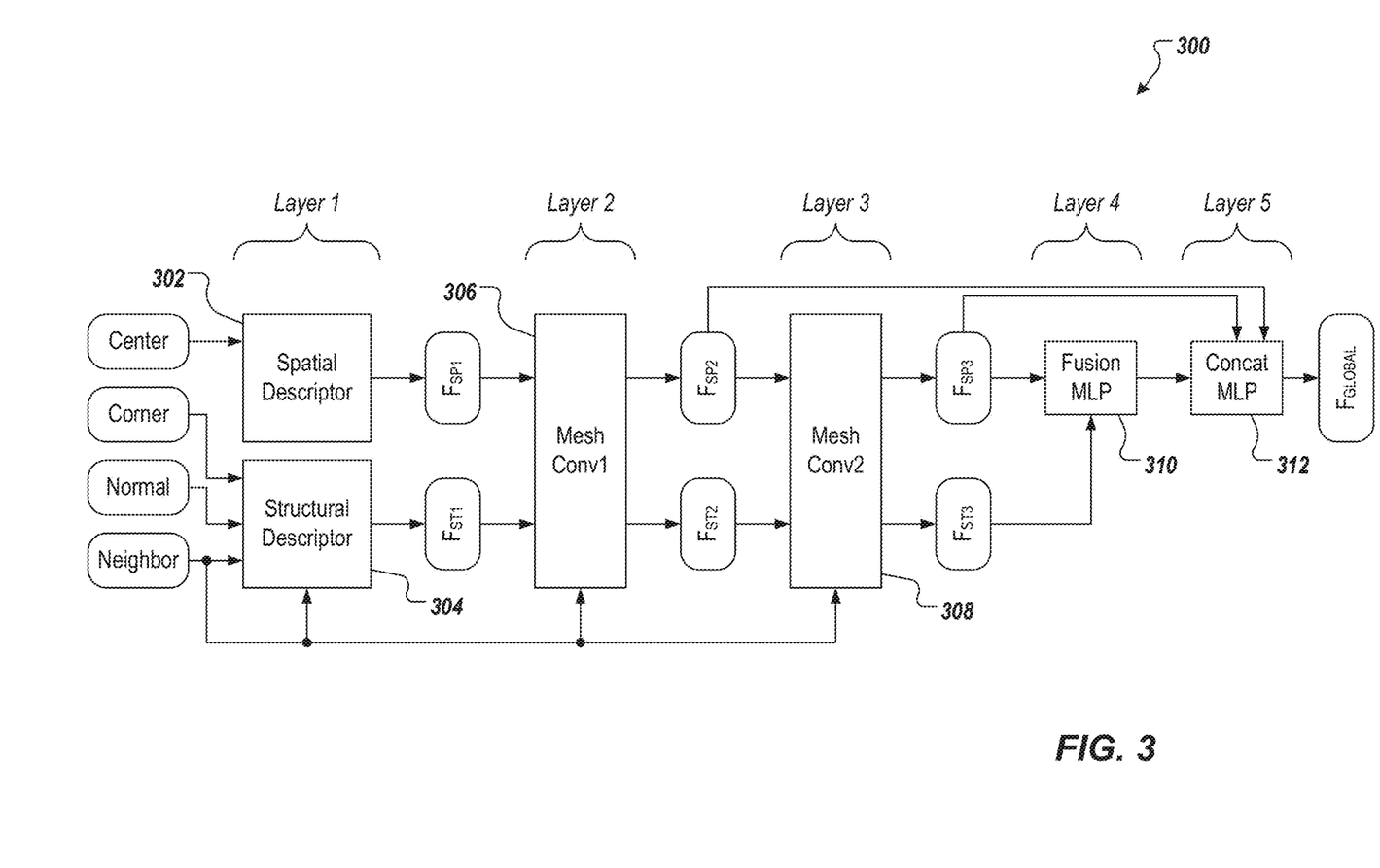
FIG. 3 depicts an example architecture of a machine learning (ML) model.

FIG. 3 depicts an architecture 300 of MeshNet. As depicted in FIG. 3, the architecture 300 includes a first layer (Layer 1) having a spatial descriptor 302 and a structural descriptor 304. Input to MeshNet is, for a respective object model, a set of faces and a set of initial values (e.g., as discussed above) for each face in the set of faces. As depicted in FIG. 3, a set of centers (e.g., coordinates [x, y, z] of the center point for each face) is provided as input to the spatial descriptor 302. In some examples, the spatial descriptor 302 applies a shared multi-layer-perceptron (MLP) to the center of each and outputs a first set of spatial feature vectors ($F_{SP1}$). As also depicted in FIG. 3, sets of corners (e.g., vectors from the center point to each vertex for each face), a set of normal (e.g., unit normal vector for each face), and sets of neighbor indexes (e.g., indexes of connected faces for each face) are provided as input to the structural descriptor 304. In some examples, the structural descriptor 304 executes a face rotate convolution and a face kernel correlation and outputs a first set of structural feature vectors ($F_{ST1}$).

Continuing, the first set of spatial feature vectors ($F_{SP1}$), the first set of structural feature vectors ($F_{ST1}$) and the sets of neighbor indexes are provided as input to a first mesh convolution block 306 in a second layer (Layer 2), which provides a second set of spatial feature vectors ($F_{SP2}$) and a second set of structural feature vectors ($F_{ST2}$) as output. The second set of spatial feature vectors ($F_{SP2}$), the second set of structural feature vectors ($F_{ST2}$) and the sets of neighbor indexes are provided as input to a second mesh convolution block 308 in a third layer (Layer 3), which provides a third set of spatial feature vectors ($F_{SP3}$) and a third set of structural feature vectors ($F_{ST3}$) as output. In some examples, each of the sets spatial feature vectors and the sets of structural feature vectors represent local feature representations of the object model being processed. The third set of spatial feature vectors ($F_{SP3}$) and the third set of structural feature vectors ($F_{ST3}$) are provided as input to a fusion MLP 310, which provides a set of fused feature vectors as input to a concatenation MLP 312. The concatenation MLP 312 also receives the second set of spatial feature vectors ($F_{SP2}$) and the third set of spatial feature vectors ($F_{SP3}$) and provides a global feature vector ($F_{GLOBAL}$) for the respective object (e.g., content object, style object, stylized object). In some examples, each set of spatial feature vectors includes a spatial feature vector for each face in the object model and each set of structural feature vectors includes a structural feature vector for each face in the object model. In some examples, the global feature vector ($F_{GLOBAL}$) is a single feature vector that represents the global features of the object.

In accordance with implementations of the present disclosure, the set of base content feature representations and the sets of base style feature representations are each provided as a set of intermediate representations determined in respective layers of the ML model during processing of the content object model and the style object model, respectively, prior to execution of the iterative process. That is, and as explained in further detail herein, the set of base content feature representations is provided as a set of local feature representations output by a layer of the ML model for the content object, and the sets of base style feature representations are each provided as a set of local feature representations from a respective layer of the ML model for the style object.

In some examples, for the content object, the set of base content feature representations includes the output of the first mesh convolution block 306 (Layer 2), namely, a second set of content structural feature vectors ($F_{ST2\_t,b}$) and a second set of content spatial feature vectors ($F_{SP2\_t,b}$). That is, as the content object model is processed through MeshNet, the output of the first mesh convolution block 306 (Layer 2) is recorded as the set of base content feature representations. Accordingly, an initial set of base content feature representations ($F_{t,b}$) can be provided as:

$$F_{t,b} = [F_{ST2\_t,b}, F_{SP2\_t,b}]$$

where t indicates target (reference to the content object) and b indicates base. In some examples, the set of base content feature representations is provided from the initial set of base content feature representations. In some examples, the set of base content feature representation ($F_{targ,b}$) is provided as a concatenation of the second set of base content structural feature vectors ($F_{ST2\_t,b}$) and the second set of content spatial feature vectors ($F_{SP2\_t,b}$). For example:

$$F_{targ,b} = F_{ST2\_t,b} * F_{SP2\_t,b}$$

In some examples, for the style object, the sets of base style feature representations are provided from the output of each of the spatial descriptor 302 and the structural descriptor 304 (Layer 1), namely, a first set of style structural feature vectors ($F_{ST1\_s,b}$) and a first set of style spatial feature vectors ($F_{SP1\_s,b}$), output of the first mesh convolution block 306 (Layer 2), namely, a second set of style structural feature vectors ($F_{ST2\_s,b}$) and a second set of style spatial feature vectors ($F_{SP2\_s,b}$), and output of the second mesh convolution block 308 (Layer 3), namely, a third set of spatial feature vectors ($F_{SP3\_s,b}$) and a third set of structural feature vectors ($F_{ST3\_s,b}$). That is, as the source object is processed through MeshNet, the output of the spatial descriptor 302 and the structural descriptor 304 (Layer 1) is recorded as a first initial set of base style feature representations, the output of the first mesh convolution block 306

(Layer 2) is recorded as a second initial set of base style feature representations, and the output of the second mesh convolution block 308 (Layer 3) is recorded as a third initial set of base style feature representations. Accordingly, initial sets of base style feature representations ($F_{s\_1,b}$, $F_{s\_2,b}$, $F_{s\_3,b}$) can be provided as:

$$F_{s\_1,b} = [F_{ST1\_s,b}, F_{SP1\_s,b}]$$

$$F_{s\_2,b} = [F_{ST2\_s,b}, F_{SP2\_s,b}]$$

$$F_{s\_3,b} = [F_{ST3\_s,b}, F_{SP3\_s,b}]$$

where s indicates source (reference to the style object) and b indicates base. In some examples, sets of base style feature representations ($F_{sour\_1,b}$, $F_{sour\_2,b}$, $F_{sour\_3,b}$) are provided as concatenations of the respective sets of style structural feature vectors and sets of style spatial feature vectors. For example:

$$F_{sour\_1,b} = F_{ST1\_s,b} \# F_{SP1\_s,b}$$

$$F_{sour\_2,b} = F_{ST2\_s,b} \# F_{SP2\_s,b}$$

$$F_{sour\_3,b} = F_{ST3\_s,b} \# F_{SP3\_s,b}$$

The set of base content feature representation ($F_{targ,b}$) and the sets of base style feature representations ($F_{sour\_1,b}$, $F_{sour\_2,b}$, $F_{sour\_3,b}$) are stored in computer-readable memory for use in calculating total loss in iterations of the iterative process, as described in further detail herein. Here, the set of base content feature representation ($F_{targ,b}$) is considered a set, because it includes base content feature representations for each face of the content object model 210, each base content feature representation being a concatenation of the content structural feature vector and the content spatial feature vector of a respective face. Similarly, each of the sets of base style feature representations ($F_{sour\_1,b}$, $F_{sour\_2,b}$, $F_{sour\_3,b}$) is considered a set, because it includes base style feature representations for each face of the source object model 212, each base style feature representation being a concatenation of the style structural feature vector and the style spatial feature vector of a respective face.

After the set of base content feature representations ($F_{targ,b}$) and the sets of base style feature representations ($F_{sour\_1,b}$, $F_{sour\_2,b}$, $F_{sour\_3,b}$) are determined and stored, the iterative process can be executed to determine the stylized object that is ultimately represented in the stylized object model 214. In some examples, the iterative process includes a set of iterations (I), where I=1, . . . , p, and p is the last iteration performed in response to determining that, at iteration p, the total loss is optimized, as described in further detail herein.

In some implementations, at a first iteration (i=1), a stylized object model 216 is initialized as the content object model 210. That is, prior to execution of the first iteration, the content object model 210 and the stylized object model 216 are identical. This is because, at the first iteration, none of the texture of the style object model 212 has been transferred to the content object model 210 to provide the stylized object model 216.

In each iteration of the iterative process, the feature extraction module 202 processes the stylized object model 216 to provide sets of stylized feature representations. More particularly, the feature extraction module 202 processes the stylized object model 216 through the ML model to provide the sets of stylized feature representations. In some examples, the ML model is the same ML model that is used to provide the base feature representations (e.g., MeshNet). In some examples, after each of one or more iterations, parameters of the stylized object model 216 are changed. In this manner, stylized feature representations generated by the ML model are different from one iteration to the next.

In further detail, for each iteration i in the set of iterations (I), sets of stylized feature representations are provided. In some examples, the sets of stylized feature representations includes the output of each of the spatial descriptor 302 and the structural descriptor 304 (Layer 1), namely, a first set of structural feature vectors ($F_{ST1\_t,i}$) and a first set of spatial feature vectors ($F_{SP1\_t,i}$), output of the first mesh convolution block 306 (Layer 2), namely, a second set of structural feature vectors ($F_{ST2\_t,i}$) and a second set of spatial feature vectors ($F_{SP2\_t,i}$), and output of the second mesh convolution block 308 (Layer 3), namely, a third set of spatial feature vectors ($F_{SP3\_t,i}$) and a third set of structural feature vectors ($F_{ST3\_t,i}$). That is, as the stylized object model 216 is processed through MeshNet, the outputs of the spatial descriptor 302 and the structural descriptor 304 (Layer 1) are recorded as a first initial set of stylized feature representations, the output of the first mesh convolution block 306 (Layer 2) is recorded as a second initial set of stylized feature representations, and the output of the second mesh convolution block 308 (Layer 3) is recorded as a third initial set of stylized feature representations. Accordingly, initial sets of stylized feature representations ($F_{st\_1,i}$, $F_{st\_2,i}$, $F_{st\_3,i}$) for each iteration (i) can be provided as:

$$F_{st\_1,i} = [F_{ST1\_st,i}, F_{SP1\_st,i}]$$

$$F_{st\_2,i} = [F_{ST2\_st,i}, F_{SP2\_st,i}]$$

$$F_{st\_3,i} = [F_{ST3\_st,i}, F_{SP3\_st,i}]$$

where st indicates stylized (reference to stylized object that results from applying at least a portion of the texture of the style object to provide the stylized object) and i indicates iteration. In some examples, a set of stylized feature representations is provided for each initial set of stylized feature representations. In some examples, the sets of stylized feature representations ($F_{so\_1,i}$, $F_{so\_2,i}$, $F_{so\_3,i}$) are each provided as a concatenation of the respective sets of structural feature vectors and sets of spatial feature vectors. For example:

$$F_{so\_1,i} = F_{ST1\_t,i} \# F_{SP1\_t,i}$$

$$F_{so\_2,i} = F_{ST2\_t,i} \# F_{SP2\_t,i}$$

$$F_{so\_3,i} = F_{ST3\_t,i} \# F_{SP3\_t,i}$$

where so indicates stylized object. The sets of stylized feature representations ($F_{so\_1,i}$, $F_{so\_2,i}$, $F_{so\_3,i}$) are stored in computer-readable memory for use in calculating total loss in the iteration i, as described in further detail herein. Here, each of the sets of stylized feature representations ($F_{so\_1,i}$, $F_{so\_2,i}$, $F_{so\_3,i}$) is considered a set, because each includes stylized feature representations for each face of the stylized object that is being generated, each stylized feature representation being a concatenation of the style structural feature vector and the style spatial feature vector of a respective face.

In some implementations, for each iteration i, the sets of stylized feature representations are provided to the loss module 204. The loss module 204 processes the set of base content feature representations, the sets of base style feature representations, and the sets of stylized feature representations to determine a total loss. In some implementations, and as described in further detail herein, the total loss is iteratively optimized, sets of stylized feature representations being provided at each iteration. In some examples, if an iteration achieves an optimized total loss, the stylized object model 216 provided as input of that iteration (e.g., iteration p) is provided as output to the smoothing module 206, and the iterations end.

In further detail, at each iteration, the loss module 204 receives the sets of stylized feature representations. In some implementations, the loss module 204 determines a content loss and a style loss, and determines a total loss based on the content loss and the style loss.

In some implementations, the content loss for an iteration ($L_{C,i}$) is determined based on the set of base content feature representations ($F_{targ,b}$) and a second set of stylized feature representations ($F_{so\_2,i}$) in the sets of stylized feature representations. In this manner, feature representations output from the second layer (Layer 2) of the ML model (i.e., local feature representations) are used to determine the content loss. In some examples, the content loss represents a degree, to which a content of the stylized object, as represented in the set of stylized feature representations, differs from a content of the content object, as represented in the set of base content feature representations.

In some examples, the content loss is calculated as a root mean square (RMS) difference between facial feature representations provided from the set of base content feature representations ($F_{targ,b}$) and facial feature representations provided from the second set of stylized feature representations ($F_{so\_2,i}$). In some examples, the following example relationship can be considered:

$$L_{C,i} = \frac{\sum_{q=1}^{n}(f_{so\_2,i,q} - f_{targ,b,q})^2}{n}$$

where $f_{so\_2,i,q}$ is a stylized feature representation of the $q^{th}$ face of the content object model 210 as processed through the ML model for the iteration i, and $f_{targ,b,q}$ is a base content feature representation of the $q^{th}$ face of the content object model 210 as initially processed through the ML before the iteration i, and n is the number of faces in the content object model 210. In other words, n is the length of the feature representations (e.g., a feature vector of n-dimensions).

In some implementations, the style loss for an iteration ($L_{S,i}$) is determined based on one or more of the sets of base style feature representations ($F_{sour\_1,b}$, $F_{sour\_b\_2,b}$, $F_{sour\_3,b}$) and one or more of the sets of stylized feature representations ($F_{so\_1,i}$, $F_{so\_2,i}$, $F_{so\_3,i}$). In this manner, feature representations output from one or more of the first layer (Layer 1), the second layer (Layer 2), and the third layer (Layer 3) of the ML model (i.e., local feature representations) are used to determine the style loss. In some examples, the style loss represents a degree, to which a style of the stylized object, as represented in the sets of stylized feature representations, differs from a style of the style object, as represented in the sets of base style feature representations.

In some examples, the style loss is calculated using the following example relationship:

$$L_{S,i} = \sum_{\omega \in \Omega, f_{so} \in F_{so,i}, f_{sour} \in F_{sour,b}} \omega \times D(f_{so}, f_{sour})$$

where $\Omega$ is a set of weights $\omega$ and D is a loss function. In some examples, each weight $\omega$ in the set of weights $\Omega$ corresponds to a respective layer of the ML model. For example $\Omega = \omega_1, \omega_2, \omega_3$, where $\omega_1$ is a first weight corresponding to the first layer (Layer 1), $\omega_2$ is a second weight corresponding to the second layer (Layer 2), and $\omega_3$ is a third weight corresponding to the third layer (Layer 3). In some examples, a respective weight is applied to a result of the loss function for feature representations of the corresponding layer used in the loss function calculation. For example, when feature representations of $f_{so}$ and $f_{sour}$ corresponding to the first layer (i.e., provided from $F_{so\_1,i}$ and $F_{sour\_1,b}$, respectively), $\omega_1$ is applied, when feature representations of $f_{so}$ and $f_{sour}$ corresponding to the second layer (i.e., provided from $F_{so\_2,i}$ and $F_{sour\_2,b}$, respectively), $\omega_2$ is applied, and when feature representations of $f_{so}$ and $f_{sour}$ corresponding to the third layer (i.e., provided from $F_{so\_3,i}$ and $F_{sour\_3,b}$, respectively), $\omega_3$ is applied.

In some implementations, the loss function D is provided as a chamfer loss, also referred to as chamfer distance, which can be described as the sum of the Euclidean (L2) distances for a feature representation of a face in a first set (e.g., $F_{so,i}$) to a feature representation of a nearest neighbor face in a second set (e.g., $F_{sour,b}$). To determine a chamfer distance (D), the following example relationship can be provided:

$$D(F_{so}, F_{sour}) = \sum_{f_{so} \in F_{so,i}} \min_{f_{sour} \in F_{sour,b}} d(f_{so}, f_{sour}) + \sum_{f_{sour} \in F_{sour,b}} \min_{f_{so} \in F_{so,i}} d(f_{so}, f_{sour})$$

where d is a distance between feature representation $f_{so}$ and feature $f_{sour}$.

In some implementations, at each iteration, the loss module 204 determines the total loss ($L_{T,i}$). In some examples, the total loss is calculated based on the following example relationship:

$$L_{T,i} = \alpha L_{C,i} + \beta L_{S,i}$$

where a is a content weight and is a style weight (e.g., $\alpha \geq 0$, $\beta \geq 0$).

In some implementations, the total loss is optimized over the iterations using an optimizer. An example optimizer includes, without limitation, a stochastic gradient descent (SGD) optimizer. In some examples, the total loss is optimized to achieve an expected value (e.g., 0), or to be within a defined degree of the expected value (e.g., ±1%).

In some implementations, optimization of the total loss includes adjusting parameters of the stylized object model 216 at each iteration. For example, and without limitation, face information can be adjusted for one or more faces of the stylized object model 216 (e.g., in the case of a mesh model). In some examples, a center (e.g., coordinates [x, y, z] of the center point) can be changed. For example, for an iteration, coordinates of a center of a face can be provided as [$x_1$, $y_1$, $z_1$], and, for a next iteration coordinates of the center of the face can be provided as [$x_2$, $y_2$, $z_2$]. In some examples, corners of a face (e.g., vectors from the center point of the face to each vertex) can be changed between iterations. In some examples, a normal of a face (e.g., unit normal vector for the face) can be changed between iterations. In some examples, between iterations, a delta value can be used for changes to respective face information, the delta value pushing toward optimization of the total loss. In some examples, the delta value can change across iterations. For example, for an iteration, the delta value can be provided as a first value and, for a next iteration, the delta value can be provided as a second value, the second value being less than the first value. In this manner, changes to the stylized object model 216 can be more coarse-grained between earlier iterations and more fine-grained between later iterations.

Accordingly, through the iterative process, the stylized object model 216 iteratively changes from being identical to the content object model 210 (i.e., the stylized object model 216 is initialized as the content object model 210) to being a stylized version of the content object model 210 including style (texture) of the style object model 212.

In accordance with implementations of the present disclosure, the smoothing module 206 receives the stylized object model 216 of the last iteration. In further detail, in the iterative process resulting in output of the iteratively changed stylized object model 216, faces of the mesh model separate, which results in holes in a subsequently generated stylized object. In view of this, smoothing is performed in view of the content object to provide the stylized object, represented in the stylized object model 214, based on surface reconstruction. In this sense, the stylized object model 216 output by the iterative process can be considered an initial stylized object model 216 that is processed through smoothing to provide the stylized object model 214.

Figure 4:
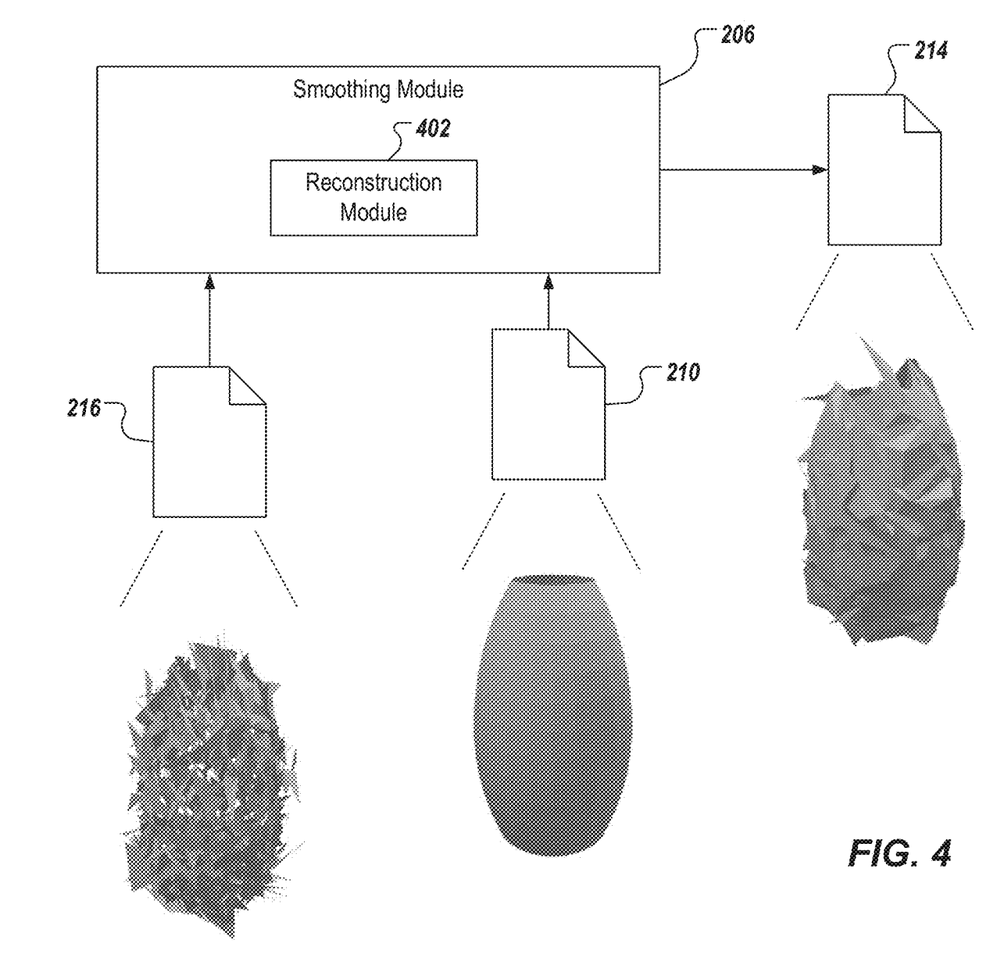
FIG. 4 depicts a representation of smoothing in accordance with implementations of the present disclosure.

FIG. 4 depicts a representation of smoothing in accordance with implementations of the present disclosure. In the example of FIG. 4, the smoothing module 206 includes a reconstruction module 402. In some examples, the smoothing module 206 receives the stylized object model 216 output by the loss module 204. As depicted in the example of FIG. 4, in the iterative process resulting in the stylized object model 216, faces of the mesh model separate, which results in holes and discontinuity.

In some implementations, the reconstruction module 402 process the content object model 210 and the stylized object model 216 to provide the stylized object model 214. In some examples, the reconstruction module 402 uses an averaging algorithm for surface reconstruction to provide the stylized object model 214.

In further detail, the content object model 210 includes a set of vertices, which can be represented as:

$$\{(x_1,y_1,z_1), \ldots ,(x_l,y_l,z_l)\}$$

where l is the number of vertices in the content object model 210. The content object model 210 also includes a set of faces, which can be represented as:

$$\{(v_1,v_2,v_3), \ldots ,(v_2,v_3,v_4), \ldots ,(v_m,v_{m-1},v_k)\}$$

where k, m≤l is the number of vertices in the content object model 210. The stylized object model 216 includes a set of vertices, which can be represented as:

$$\{(x_{11},y_{11},z_{11}), \ldots ,(x_{n1},Y_{n2},z_{n3})\}$$

where n is the number of faces in the initial stylized object model 210. The content object model 210 also includes a set of faces, which can be represented as:

$$\{(v_1,v_2,v_3), \ldots ,(v_2,v_3,v_4), \ldots ,(v_m,v_{m-1},v_k)\}$$

where k, m≤l is the number of vertices in the stylized object model 216.

In some implementations, for each vertex in the set of vertices of the content object model 210, all faces (f) that the vertex is included in is determined and a vertex-to-face mapping is provided. This can be represented as, for example:

$$\{v_1:[f_{n1}, \ldots ,f_{n4}], \ldots ,v_l:[f_{n9}, \ldots ,f_{n12}]\}$$

where $n_1, \ldots, n_{12} < n$ and $f_{ij}$ is an index of a face.

Because a vertex is present in each face, specific values can be used to determine average values. For example, for each vertex in the vertex-to-face mapping:

$$\text{vertex} \rightarrow f_{n1}, \ldots , f_{n3}$$

$$\text{avg} \rightarrow \text{Average}(F[f_{n1}], \ldots ,F[f_{n3}])$$

This can be mathematically represented as:

$$\forall v \in V, \frac{\sum_{i \in v} F[i]}{n}$$

In general, smoothing is achieved by joining faces of the stylized object model 216 with their respective neighbor faces as determined from the content object model 210 (i.e., the original content object).

As introduced above, implementations of the present disclosure have been described in detail with reference to object models being mesh models, but that any appropriate models can be used, such as point cloud models. In the case of point cloud models, the ML model for generating the set of base content feature representations, the sets of base style feature representations, and the sets of stylized feature representations can include PointNet. PointNet is described in detail in *PointNet: Deep Learning on Point Sets for 3D Classification and Segmentation*, Qi et al., Apr. 10, 2017 ("Qi"), which is expressly incorporated herein by reference in the entirety. In some implementations, PointNet is trained using at least one of ShapeNet and ModelNet40. ShapeNet is described in detail in Wu et al., *3d shapenets: A deep representation for volumetric shapes*, Proceedings of the IEEE Conference on Computer Vision and Pattern Recognition, pages 1912-1920, 2015, which is expressly incorporated herein by reference in the entirety. For example, the classification network of PointNet can be used to provide local feature representations and global feature representations for texture transfer as described herein. Further, for smoothing, any appropriate smoothing algorithm can be used for removing and/or adding points to the point cloud to smooth the stylized object.

Figure 5:
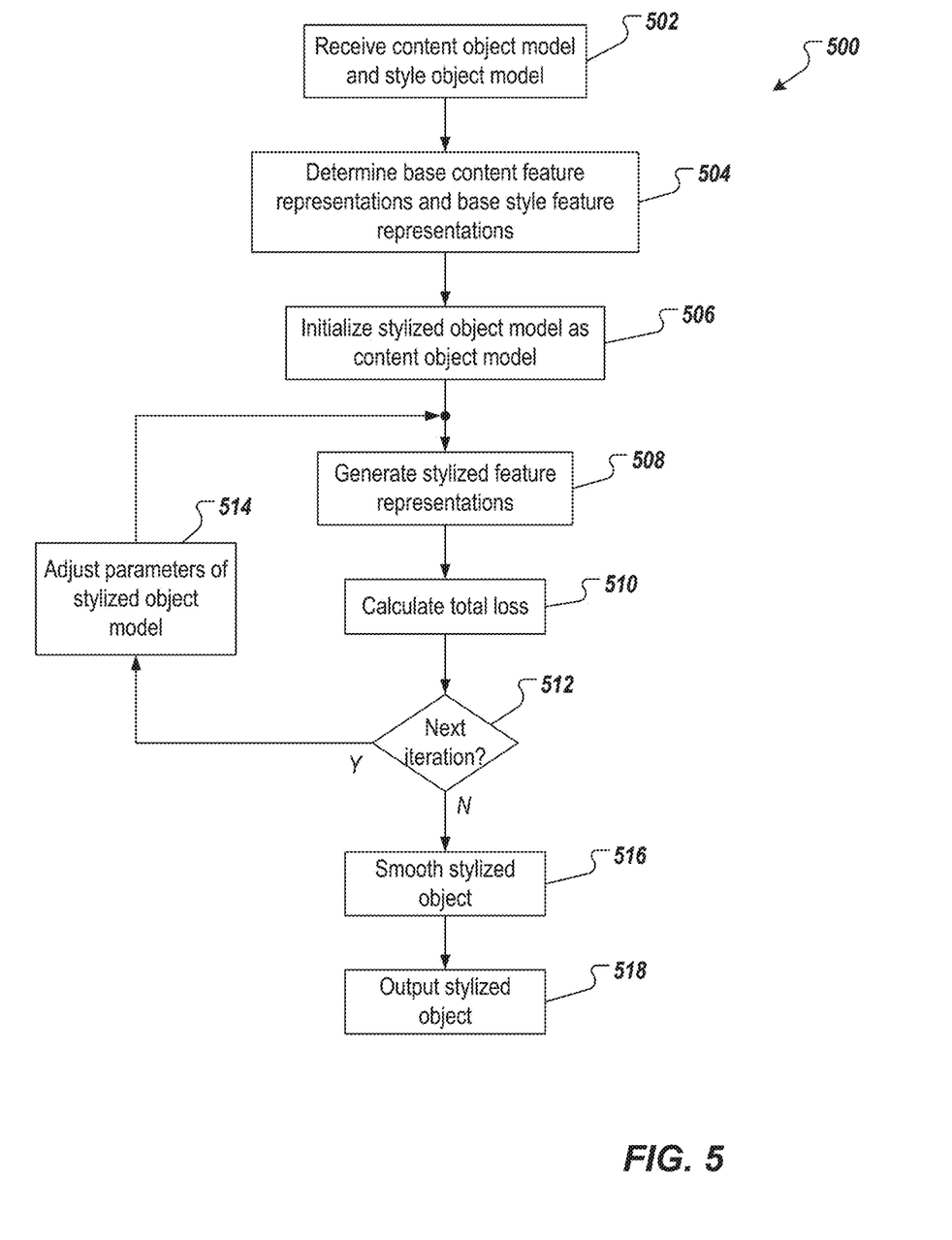
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices.

A content object model (target) and a style object model (source) are received (502). For example, and as described herein, the intelligent design platform of the present disclosure receives a content object model 210 and a style object model 212, each as a respective computer-readable file. A set of base content feature representations and sets of base style feature representations are generated (504). For example, and as described herein, the content object model 210 is processed through a ML model (e.g., MeshNet trained on ShapeNet dataset) to provide the set of base content feature representations ($F_{targ,b}$) and the style object model 212 is processed through the ML model to provide the sets of base style feature representations ($F_{sour\_1,b}$, $F_{sour\_2,b}$, $F_{sour\_3,b}$).

A stylized object model is initialized as the content object model (506) and the iterative process to generate a stylized object begins. Sets of stylized feature representations are generated (508). For example, and as described herein, for a current iteration i, the stylized object model is processed through the ML model to provide the sets of stylized feature representations ($F_{so\_1,i}$, $F_{so\_2,i}$, $F_{so\_3,i}$). A total loss is calculated (510). For example, and as described in detail herein, the loss module 204 determines the total loss based on the set of base content representations, the sets of base style feature representations, and the sets of stylized feature representations. It is determined whether a next iteration is to be performed (512). For example, and as described herein, the total loss can be compared to an expected value and, if the total loss is not equal to or within a defined range of the expected value (e.g., total loss is not optimized), it can be determined that a next iteration is to be performed. In other words, for the current iteration i, it can be determined whether the total loss has been optimized. If a next iteration is to be performed, one or more parameters of the stylized object model are adjusted (514), and the example process 500 loops back. For example, and as described herein, one or more parameters of the stylized object model are adjusted to iteratively morph the style (texture) of the stylized object model between iterations.

If a next iteration is not to be performed, a stylized object is smoothed (516). For example, and as described herein, the smoothing module 206 process the content object model 210 and the stylized object model 216 to provide the stylized object model 214. In some examples, the smoothing module 206 uses an averaging algorithm for surface reconstruction to provide the stylized object model 214. The stylized object model is output (518). For example, and as described herein, the smoothing module 206 outputs the stylized object model 214 as a computer-readable file.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for multi-dimensional texture transfer between digital models, the method comprising:
    processing a content object model through a machine learning (ML) model to provide a set of base content feature representations as a concatenation of content structural feature vectors and content spatial feature vectors output from a first mesh convolution block of the ML model, the content object model comprising a three-dimensional representation of a content object;
    processing a style object model through the ML model to provide sets of base style feature representations based on output of a spatial descriptor of the ML model, output of a structural descriptor of the ML model, output of the first mesh convolution block of the ML model, and output of a second mesh convolution block of the ML model, the style object model comprising a three-dimensional representation of a style object having a three-dimensional texture that is to be applied to the content object, wherein the three-dimensional texture is represented in the style object model as a first set of points in three-dimensional space, each point comprising an x-coordinate, a y-coordinate, and a z-coordinate;
    initializing an initial stylized object model as the content object model, the initial stylized object model comprising a three-dimensional representation of a stylized object and being absent the three-dimensional texture of the style object;
    executing two or more iterations of an iterative process, each of the two or more iterations comprising:
        generating, by the ML model, sets of stylized feature representations for the initial stylized object model, the initial stylized object model having one or more adjusted parameters relative to a previous iteration, the one or more adjusted parameters at least partially comprising multi-dimensional points in a second set of points, each point in the second set of points comprising an x-coordinate, a y-coordinate, and a z-coordinate, and defining an extent of the stylized object in three-dimensional space to represent morphing of the stylized object relative to the previous iteration toward the three-dimensional texture of the style object, the one or more adjusted parameters being based on a delta value pushing toward optimization of a total loss across iterations,
        determining the total loss based on the sets of stylized feature representations of the initial stylized object model, the set of base content feature representations of the content object model, and the sets of base style feature representations of the style object model, and
        determining that the total loss is non-optimized, and in response, initiating a next iteration;
    executing an iteration of the iterative process, the iteration comprising determining that the total loss is optimized, and in response providing the initial stylized object model as output of the iterative process; and
    smoothing the initial stylized object model to provide a stylized object model representing the stylized object comprising at least a portion of content of the content object model and at least a portion of the three-dimensional texture of the style object model.

2. The method of claim 1, wherein the set of base content feature representations comprises local feature representations output by a layer of the ML model comprising the first mesh convolution network.

3. The method of claim 1, wherein the sets of stylized feature representations comprise a set of local feature representations for each of a plurality of layers of the ML model comprising the spatial descriptor, the structural descriptor, the first mesh convolution network, and the second mesh convolution network.

4. The method of claim 1, wherein the sets of base style feature representations comprise a set of local feature representations for each of a plurality of layers of the ML model comprising the spatial descriptor, the structural descriptor, the first mesh convolution network, and the second mesh convolution network.

5. The method of claim 1, wherein the total loss is determined at least partially based on a content loss, the content loss being calculated based on differences between the set of base content feature representations and a set of stylized feature representations of the sets of stylized feature representations, set of stylized feature representations corresponding to a layer of the ML model.

6. The method of claim 1, wherein the total loss is determined at least partially based on a style loss, the style loss being calculated based on differences between the sets of base style feature representations and the sets of stylized feature representations, each set of base style feature representations and each set of stylized feature representations corresponding to a layer of the ML model.

7. The method of claim 1, wherein smoothing at least partially comprises executing an averaging routine based on the initial stylized object model and the content object model.

8. The method of claim 1, wherein each of the content object model, the style object model, and the stylized object model is provided as a mesh model and the ML model comprises MeshNet.

9. The method of claim 1, wherein each of the content object model, the style object model, and the stylized object model is provided as a point cloud model and the ML model comprises PointNet.

10. One or more non-transitory computer-readable storage media coupled to one or more processors and having instructions stored thereon which, when executed by the one or more processors, cause the one or more processors to perform operations for multi-dimensional texture transfer between digital models, the operations comprising:

processing a content object model through a machine learning (ML) model to provide a set of base content feature representations as a concatenation of content structural feature vectors and content spatial feature vectors output from a first mesh convolution block of the ML model, the content object model comprising a three-dimensional representation of a content object;

processing a style object model through the ML model to provide sets of base style feature representations based on output of a spatial descriptor of the ML model, output of a structural descriptor of the ML model, output of the first mesh convolution block of the ML model, and output of a second mesh convolution block of the ML model, the style object model comprising a three-dimensional representation of a style object having a three-dimensional texture that is to be applied to the content object, wherein the three-dimensional texture is represented in the style object model as a first set of points in three-dimensional space, each point comprising an x-coordinate, a y-coordinate, and a z-coordinate;

initializing an initial stylized object model as the content object model, the initial stylized object model comprising a three-dimensional representation of a stylized object and being absent the three-dimensional texture of the style object;

executing two or more iterations of an iterative process, each of the two or more iterations comprising:
generating, by the ML model, sets of stylized feature representations for the initial stylized object model, the initial stylized object model having one or more adjusted parameters relative to a previous iteration, the one or more adjusted parameters at least partially comprising multi-dimensional points in a second set of points, each point in the second set of points comprising an x-coordinate, a y-coordinate, and a z-coordinate, and defining an extent of the stylized object in three-dimensional space to represent morphing of the stylized object relative to the previous iteration toward the three-dimensional texture of the style object, the one or more adjusted parameters being based on a delta value pushing toward optimization of a total loss across iterations,
determining the total loss based on the sets of stylized feature representations of the initial stylized object model, the set of base content feature representations of the content object model, and the sets of base style feature representations of the style object model, and
determining that the total loss is non-optimized, and in response, initiating a next iteration;

executing an iteration of the iterative process, the iteration comprising determining that the total loss is optimized, and in response providing the initial stylized object model as output of the iterative process; and smoothing the initial stylized object model to provide a stylized object model representing the stylized object comprising at least a portion of content of the content object model and at least a portion of the three-dimensional texture of the style object model.

11. The non-transitory computer-readable storage media of claim 10, wherein the set of base content feature representations comprises local feature representations output by a layer of the ML model comprising the first mesh convolution network.

12. The non-transitory computer-readable storage media of claim 10, wherein the sets of stylized feature representations comprise a set of local feature representations for each of a plurality of layers of the ML model comprising the spatial descriptor, the structural descriptor, the first mesh convolution network, and the second mesh convolution network.

13. The non-transitory computer-readable storage media of claim 10, wherein the sets of base style feature representations comprise a set of local feature representations for each of a plurality of layers of the ML model comprising the spatial descriptor, the structural descriptor, the first mesh convolution network, and the second mesh convolution network.

14. The non-transitory computer-readable storage media of claim 10, wherein the total loss is determined at least partially based on a content loss, the content loss being calculated based on differences between the set of base content feature representations and a set of stylized feature representations of the sets of stylized feature representations, set of stylized feature representations corresponding to a layer of the ML model.

15. The non-transitory computer-readable storage media of claim 10, wherein the total loss is determined at least partially based on a style loss, the style loss being calculated based on differences between the sets of base style feature representations and the sets of stylized feature representations, each set of base style feature representations and each set of stylized feature representations corresponding to a layer of the ML model.

16. The non-transitory computer-readable storage media of claim 10, wherein smoothing at least partially comprises executing an averaging routine based on the initial stylized object model and the content object model.

17. The non-transitory computer-readable storage media of claim 10, wherein each of the content object model, the style object model, and the stylized object model is provided as a mesh model and the ML model comprises MeshNet.

18. The non-transitory computer-readable storage media of claim 10, wherein each of the content object model, the style object model, and the stylized object model is provided as a point cloud model and the ML model comprises PointNet.

19. A system, comprising:
one or more processors; and
a computer-readable storage device coupled to the one or more processors and having instructions stored thereon which, when executed by the one or more processors, cause the one or more processors to perform operations for multi-dimensional texture transfer between digital models, the operations comprising:
processing a content object model through a machine learning (ML) model to provide a set of base content feature representations as a concatenation of content structural feature vectors and content spatial feature vectors output from a first mesh convolution block of the ML model, the content object model comprising a three-dimensional representation of a content object;

processing a style object model through the ML model to provide sets of base style feature representations based on output of a spatial descriptor of the ML model, output of a structural descriptor of the ML model, output of the first mesh convolution block of the ML model, and output of a second mesh convolution block of the ML model, the style object model comprising a three-dimensional representation of a style object having a three-dimensional texture that is to be applied to the content object, wherein the three-dimensional texture is represented in the style object model as a first set of points in three-dimensional space, each point comprising an x-coordinate, a y-coordinate, and a z-coordinate;

initializing an initial stylized object model as the content object model, the initial stylized object model comprising a three-dimensional representation of a stylized object and being absent the three-dimensional texture of the style object;

executing two or more iterations of an iterative process, each of the two or more iterations comprising:
  generating, by the ML model, sets of stylized feature representations for the initial stylized object model, the initial stylized object model having one or more adjusted parameters relative to a previous iteration, the one or more adjusted parameters at least partially comprising multi-dimensional points in a second set of points, each point in the second set of points comprising an x-coordinate, a y-coordinate, and a z-coordinate, and defining an extent of the stylized object in three-dimensional space to represent morphing of the stylized object relative to the previous iteration toward the three-dimensional texture of the style object, the one or more adjusted parameters being based on a delta value pushing toward optimization of a total loss across iterations,
  determining the total loss based on the sets of stylized feature representations of the initial stylized object model, the set of base content feature representations of the content object model, and the sets of base style feature representations of the style object model, and
  determining that the total loss is non-optimized, and in response, initiating a next iteration;

executing an iteration of the iterative process, the iteration comprising determining that the total loss is optimized, and in response providing the initial stylized object model as output of the iterative process; and smoothing the initial stylized object model to provide a stylized object model representing the stylized object comprising at least a portion of content of the content object model and at least a portion of the three-dimensional texture of the style object model.

20. The system of claim 19, wherein the set of base content feature representations comprises local feature representations output by a layer of the ML model comprising the first mesh convolution network.

21. The system of claim 19, wherein the sets of stylized feature representations comprise a set of local feature representations for each of a plurality of layers of the ML model comprising the spatial descriptor, the structural descriptor, the first mesh convolution network, and the second mesh convolution network.

22. The system of claim 19, wherein the sets of base style feature representations comprise a set of local feature representations for each of a plurality of layers of the ML model comprising the spatial descriptor, the structural descriptor, the first mesh convolution network, and the second mesh convolution network.

23. The system of claim 19, wherein the total loss is determined at least partially based on a content loss, the content loss being calculated based on differences between the set of base content feature representations and a set of stylized feature representations of the sets of stylized feature representations, set of stylized feature representations corresponding to a layer of the ML model.

24. The system of claim 19, wherein the total loss is determined at least partially based on a style loss, the style loss being calculated based on differences between the sets of base style feature representations and the sets of stylized feature representations, each set of base style feature representations and each set of stylized feature representations corresponding to a layer of the ML model.

25. The system of claim 19, wherein smoothing at least partially comprises executing an averaging routine based on the initial stylized object model and the content object model.

26. The system of claim 19, wherein each of the content object model, the style object model, and the stylized object model is provided as a mesh model and the ML model comprises MeshNet.

27. The system of claim 19, wherein each of the content object model, the style object model, and the stylized object model is provided as a point cloud model and the ML model comprises PointNet.

* * * * *